Sept. 8, 1970 W. B. EDMONDS 3,526,990
PLATFORM WITH HAND-AND-ARM SIMULATION FOR USE WITH
HAND-OPERATED PUPPETS, DOLLS
AND VENTRILOQUIAL FIGURES
Filed July 27, 1967 2 Sheets-Sheet 1

INVENTOR.
BY William B. Edmonds

Sept. 8, 1970 W. B. EDMONDS 3,526,990
PLATFORM WITH HAND-AND-ARM SIMULATION FOR USE WITH
HAND-OPERATED PUPPETS, DOLLS
AND VENTRILOQUIAL FIGURES
Filed July 27, 1967
2 Sheets-Sheet 2
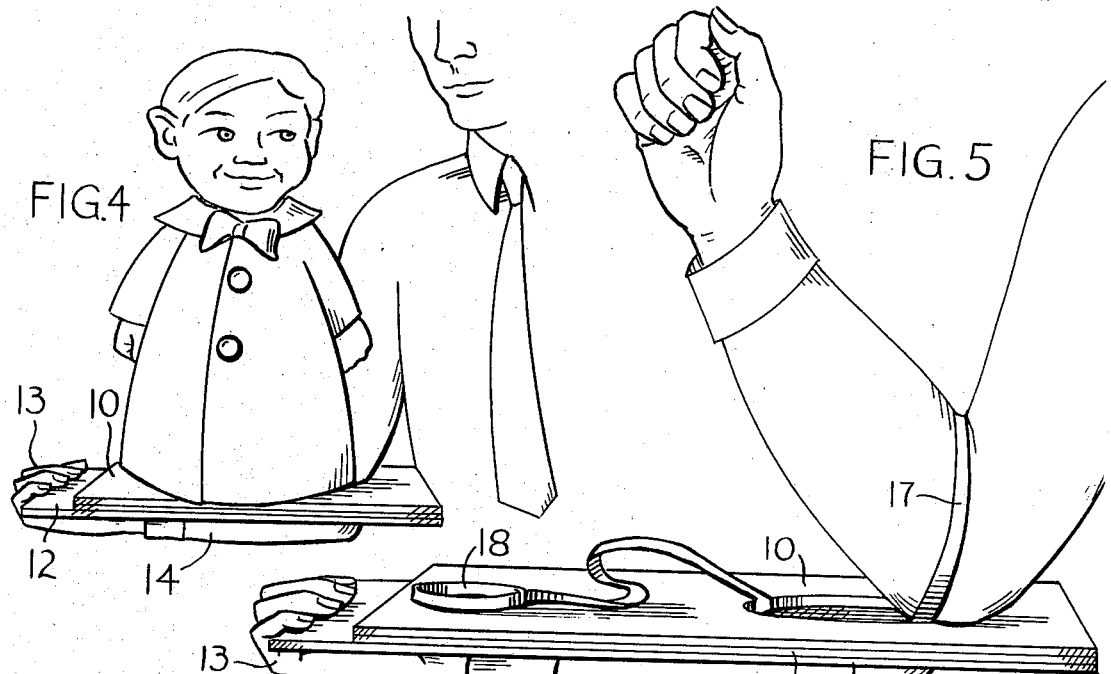
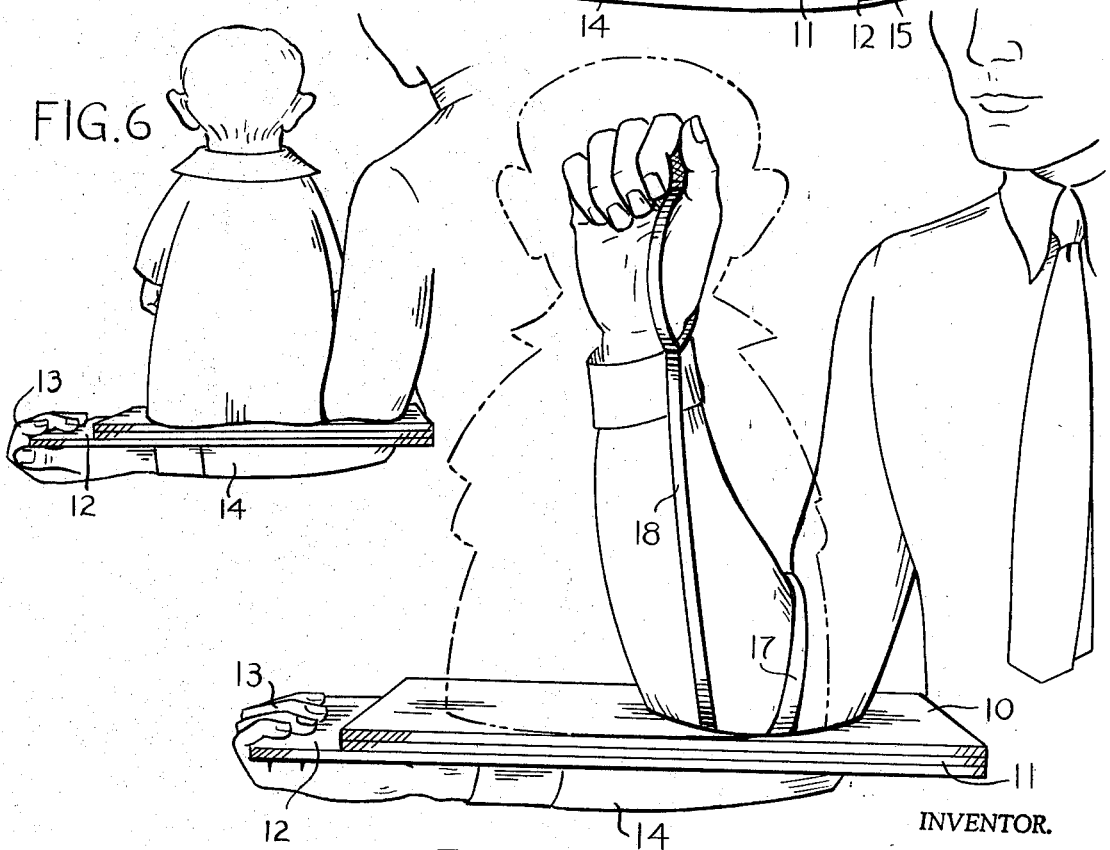
INVENTOR.
BY William B. Edmonds United States Patent Office 3,526,990
Patented Sept. 8, 1970

3,526,990
PLATFORM WITH HAND-AND-ARM SIMULATION FOR USE WITH HAND-OPERATED PUPPETS, DOLLS AND VENTRILOQUIAL FIGURES
William B. Edmonds, 1444 Shakespeare Ave., Bronx, N.Y. 10452
Filed July 27, 1967, Ser. No. 662,557
Int. Cl. A63h 3/14; A63j 5/02
U.S. Cl. 46—116                    3 Claims

ABSTRACT OF THE DISCLOSURE

This invention relates to a new and unique method of presenting a hand-puppet, hand-operated doll, or ventriloquial figure through the use of a small platform with a hand-and-arm simulation. The invention adds immeasurably to the desired illusion that the puppet, doll or ventriloquial figure has a life and will of its own by totally concealing the operator's arm and hand, thereby concealing the method of operation.

---

The skillful practice of pupppetry and/or ventriloquism is dependent largely on the art of illusion. The traditional ventriloquist's "dummy," seated on the operator's knee and concealing the manipulative human hand, appears to be talking and moving its eyes and mouth and doing so of its own volition. Similarly, the stringed marionette, also operated by human hands, appears to be walking or engaging in other physical activities. The illusion is successful because the human and manipulative arm and hand of the operator is never seen. But the puppeteer-ventriloquist who appears with a small hand-puppet suffers the handicap of having the observers see only too clearly the human arm protruding gigantically and incongruously from under the hollow hand-puppet's robe or skirt. Thus, the purpose of the invention or device described here is to present a means whereby this handicap will be successfully eliminated and the illusion of the puppet or doll making its own movements will be obtained.

Figure 1:
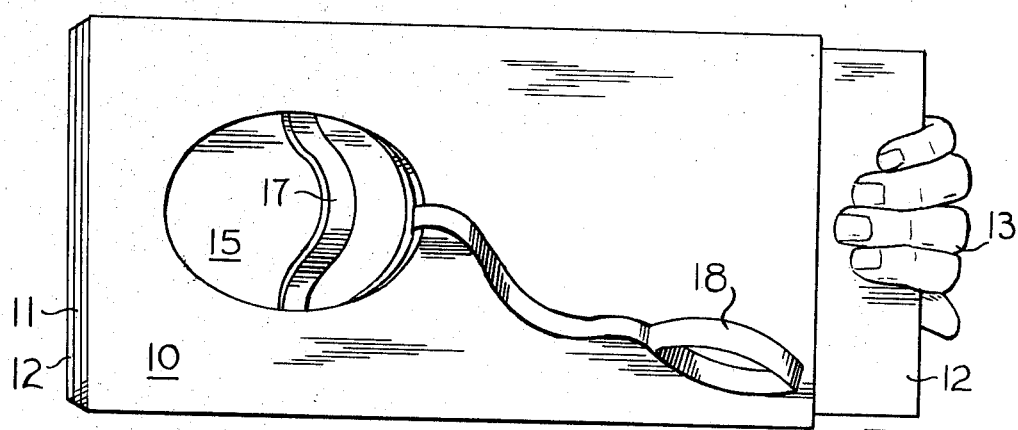
Figure 2:
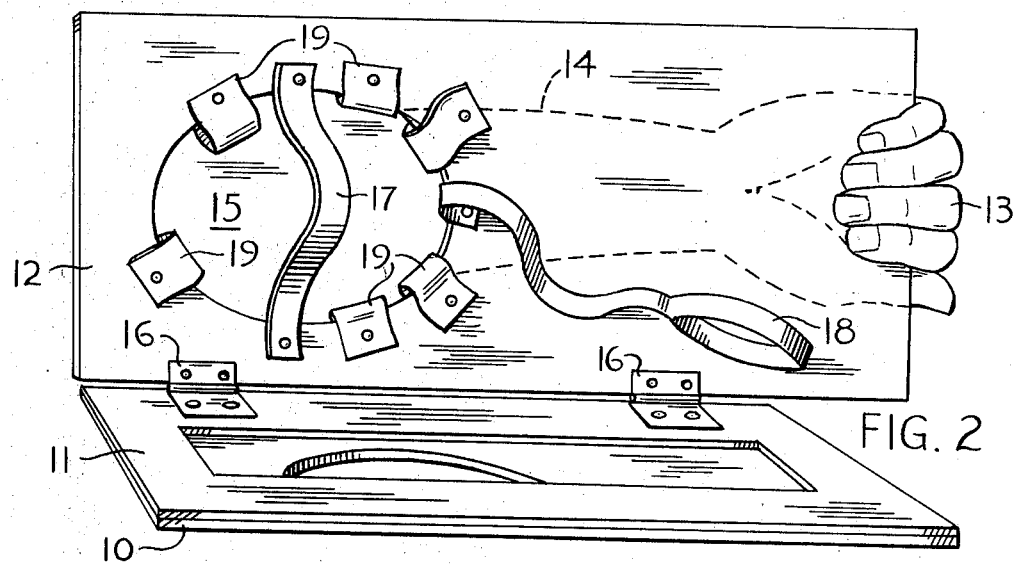
Figure 3:
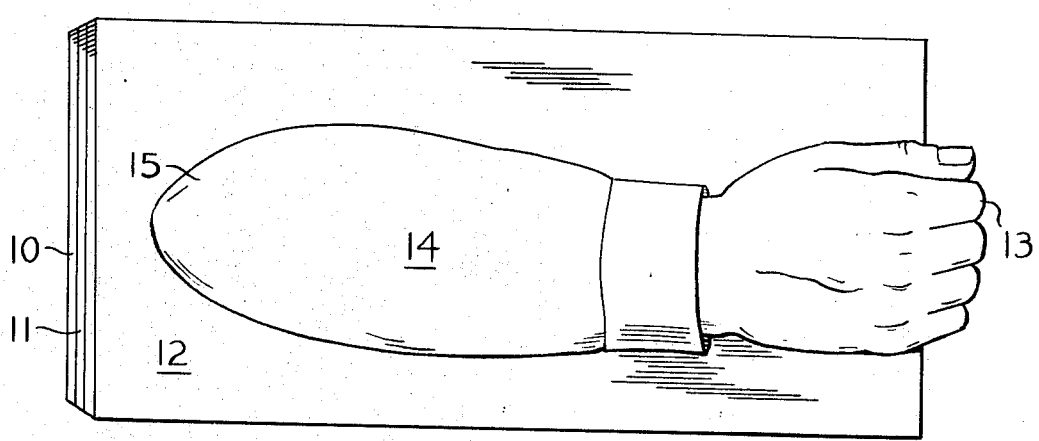

In the drawings:
FIG. 1 is a top view of platform;
FIG. 2 is the interior structure of platform showing method of attaching simulated arm to platform;
FIG. 3 is bottom view of platform and arm simulation;
FIG. 4 is front view of platform and simulated arm with puppet concealing operator's arm;
FIG. 5 is front view of platform without puppet showing both operator's arm and simulated arm;
FIG. 6 is a back view of platform and simulated arm with puppet concealing operator's arm; and
FIG. 7 is front view of platform and simulated arm with operator's arm in position of operation.

The basic structure consists of a flat platform (here consisting of three lightweight boards 10, 11 and 12 fastened together) and an artificial hand 13 and arm 14 (or the facsimile of a hand and arm) fastened to the platform, one end of which can be unfastened. The elbow end 15 of the arm 14 can be fastened to the platform through an oval hole in it (as seen in the drawings) and may be fastened permanently or impermanently, depending on the material employed to carry out the arm-and-hand simulation. If the artificial arm and hand are of a flexible material, such as latex or rubber, the elbow end of the artificial arm may be affixed permanently to the platform, providing enough space is left in the oval hole of the platform to attach a cloth sleeve encompassing the artificial arm and matching the operator's sleeves, assuming the operator wishes to carry the illusion this far, which is advisable in any sincere attempt to carry out the illusion to any professional or completely realistic degree. If, however, the artificial hand is of a non-flexible plastic material, it should remain fixed in the position seen in all the drawings, and the edges of the elbow end of the artificial arm should be long enough at various points to enter the oval hole and be impermanently attached (with snaps, bolts, protrusions or any other fastening devices) 19 as seen in FIG. 2. To provide an area for these fastening devices the center board 11 should, preferably, be of a frame-like construction as seen in FIG. 2.

The oval-shaped hole penetrating all three boards of the platform permits the interior of the elbow end of the artificial arm to serve as a pocket for the placement of the operator's own elbow, as seen in FIG. 5. The two topboards 10 and 11 of the platform are permanently attached to each other and should be somewhat shorter than the bottom board 12 and attached to it by hinges 16. This prevents the two topboards from interfering with the position of the fingers of the artificial hand when the topboards are raised for the purpose of fastening the ends of the artificial arm (and its sleeve) to the upper part of the bottom board. Also attached to the upper part of the bottom board but rising beyond the level of the upper boards through the oval hole are an adjustable thumb-strap 18 and an adjustable elbow strap 17. The straps, preferably, should be flexible but strong, and cushioned at points where they are to encircle the human thumb and arm; the latter solely for reasons of comfort to the wearer. By using both straps, the weight of the platform and artificial arm (which should be kept as light as possible) is divided between the operator's hand and arm and the bulk of the weight can be shifted from thumb to arm and back unnoticed simply by a relaxing or tensing of the operator's thumb. This dual attachment also helps to balance the platform and keep it at the desired horizontal level, providing thus the illusion of a level and dependable stand for the puppet (who appears to be standing, unaided, on the platform). The upright position of the human forearm should, of course, be maintained, and the hole and pocket 15 into which the operator's own elbow is inserted should be large enough for comfort but small enough to provide an additional means to insure the steadiness and level angle of the platform.

The broken lines in FIG. 7 show how a puppet or doll can be placed over a human forearm and conceal it completely from the observer's eye. The human fingers entering the hollow head of the hand-puppet or ventriloquial figure remain free to manipulate the puppet's head, mouth and eyes, and the turning of the operator's wrist can make the puppet appear to turn in various directions, while the operator's elbow remains stationary, fixed and immobile in the aforementioned pocket 15.

FIG. 4 shows how the puppet might appear to the observer, the operator's arm totally concealed from the observer's view, and the artificial arm and hand carrying forth the desired illusion that the operator is merely carrying a standing puppet or doll on a platform, the method of the pupppet's manipulation thereby remaining a mystery to most observers, if not all. FIG. 6 shows how the puppet might appear from the rear of both puppet and operator, the puppet's long robe concealing all of the operator's forearm, making it possible for them to perform even in the center of a roomful of observers without revealing the method by which the puppet is manipulated.

The above-mentioned method of construction and the materials designated are not to be construed as limiting the invention in any way. Other materials may be used instead of the three boards mentioned by substituting for them any suitable form of plastic if that is desired in the construction or production of the item.

The artificial arm and hand will be most effective when carefully cast with materials which may lend a semblance of reality, such as a flesh-colored latex or vinyyl. But if these materials are not available or practical, a similar effect may be presented by substituting a stuffed sleeve to resemble an arm, and a glove into which flexible wire is inserted, making it possible to bend the fingers of the glove around the edge of the platform in a manner similar to that depicted in the illustrations.

Although the completed structure as described and seen in all the illustrations may be used with any hand-puppet, doll or ventriloquial figure in which there is room enough to place a human hand and arm, the structure could, if desired, include (or incorporate with the structure) a hand-puppet, doll or ventriloquial figure permanently or impermanently attached to the platform, the attachment hidden beneath the puppet's or doll's robe.

What is claimed is:

1. A hand puppet support comprising:
   a flat rigid platform having a top and a bottom surface;
   means creating a life-like simulation of the hand and at least of forearm of a human holding the platform mounted on the bottom surface of the platform;
   means on the top surface of the platform for receiving and locating a crooked elbow of a person using the platform;
   the elbow locating means being disposed immediately above the end portion of the simulating means opposite the hand simulating portion;
   means for mounting the platform to the arm and hand of the user.

2. The support of claim 1, and including a hand operated puppet, doll, or ventriloquial figure mounted on the top surface of the platform.

3. The combination of claim 2 wherein said puppet, doll or figure is mounted over the elbow locating means.

References Cited

UNITED STATES PATENTS

| | | | |
|---|---|---|---|
| 1,651,738 | 12/1927 | Stein et al. | 46—154 X |
| 2,725,670 | 12/1955 | Hodes | 46—154 X |
| 2,908,499 | 10/1959 | Drane. | |

ANTON O. OECHSLE, Primary Examiner

A. W. KRAMER, Assistant Examiner

U.S. Cl. X.R.

46—154; 272—8